US012771145B2

(12) United States Patent
Yoon

(10) Patent No.: US 12,771,145 B2
(45) Date of Patent: Oct. 20, 2026

(54) METHOD OF ASSIGNING COMMUNICATION ID AND BATTERY PACK PROVIDING THE METHOD

(71) Applicant: LG ENERGY SOLUTION, LTD., Seoul (KR)

(72) Inventor: Ho Byung Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 936 days.

(21) Appl. No.: 17/923,221

(22) PCT Filed: Nov. 4, 2021

(86) PCT No.: PCT/KR2021/015953
§ 371 (c)(1),
(2) Date: Sep. 27, 2023

(87) PCT Pub. No.: WO2022/145688
PCT Pub. Date: Jul. 7, 2022

(65) Prior Publication Data

US 2024/0055870 A1 Feb. 15, 2024

(30) Foreign Application Priority Data

Dec. 28, 2020 (KR) ........................ 10-2020-0184479

(51) Int. Cl.
*H02J 7/44* (2026.01)
*H02J 7/50* (2026.01)
*H02J 7/96* (2026.01)

(52) U.S. Cl.
CPC *H02J 7/44* (2026.01); *H02J 7/50* (2026.01); *H02J 7/96* (2026.01)

(58) Field of Classification Search
CPC ...... H02J 7/40; H02J 7/44; H02J 7/445; H02J 7/50; H02J 7/80; H02J 7/96; H02J 7/47;
(Continued)

(56) References Cited

U.S. PATENT DOCUMENTS

| | | | |
|---|---|---|---|
| 9,446,679 | B2 | 9/2016 | Kataoka et al. |
| 10,794,957 | B2 | 10/2020 | Yoon et al. |

(Continued)

FOREIGN PATENT DOCUMENTS

| | | | | |
|---|---|---|---|---|
| CN | 105895973 A | * 8/2016 | .............. | B60L 53/66 |
| CN | 106253363 A | * 12/2016 | .............. | H02J 3/381 |

(Continued)

OTHER PUBLICATIONS

International Search Report (with translation) and Written Opinion dated Mar. 2, 2022, issued in corresponding International Application No. PCT/KR2021/015953.

(Continued)

*Primary Examiner* — Rexford N Barnie
(74) *Attorney, Agent, or Firm* — Morgan, Lewis & Bockius LLP

(57) ABSTRACT

A method of assigning a communication ID and a battery pack providing the method are disclosed. The battery pack may include: a plurality of slave BMSs to manage a plurality of battery modules having a plurality of battery cells; and a master BMS to control the slave BMSs to charge the battery modules after a predetermined battery module is discharged, and to receive data for each battery cell indicating a first cell voltage before the charging and a second cell voltage after the charging. The master BMS may determine a battery module including a low-voltage battery cell having the second cell voltage lower than the first cell voltage as a battery module located at a higher potential adjacent to the discharged battery module and estimate a connection order of the battery modules, and may assign a communication ID of each of the slave BMSs based on the estimated connection order.

14 Claims, 6 Drawing Sheets

(58) Field of Classification Search
CPC . H01M 10/42; H01M 10/4207; H01M 10/441
USPC ................................ 320/104, 105, 106, 107
See application file for complete search history.

(56) References Cited

U.S. PATENT DOCUMENTS

| | | | | |
|---|---|---|---|---|
| 2011/0175574 | A1 | 7/2011 | Sim et al. | |
| 2014/0018990 | A1 | 1/2014 | Kataoka et al. | |
| 2014/0354291 | A1 | 12/2014 | Kikuchi et al. | |
| 2015/0084598 | A1* | 3/2015 | Song | H02J 13/12 320/128 |
| 2018/0149704 | A1* | 5/2018 | Yoon | H01M 10/425 |
| 2018/0287218 | A1 | 10/2018 | Lim et al. | |
| 2019/0181656 | A1* | 6/2019 | Cooper | G01R 31/382 |
| 2020/0200828 | A1 | 6/2020 | Sung | |
| 2020/0284844 | A1 | 9/2020 | Kawamoto et al. | |
| 2021/0247461 | A1 | 8/2021 | Park | |
| 2021/0336301 | A1 | 10/2021 | Hwang et al. | |
| 2021/0362623 | A1 | 11/2021 | Hori | |
| 2022/0065944 | A1* | 3/2022 | Song | G01R 19/16542 |
| 2022/0407121 | A1 | 12/2022 | Lee et al. | |
| 2023/0187945 | A1* | 6/2023 | Yang | G01R 31/3646 702/63 |

FOREIGN PATENT DOCUMENTS

| | | | | | |
|---|---|---|---|---|---|
| EP | 2293375 | A1 | | 3/2011 | |
| EP | 3654439 | A1 | | 5/2020 | |
| EP | 4099474 | A1 | | 12/2022 | |
| JP | 2010-146991 | A | | 7/2010 | |
| JP | 2011-034964 | A | | 2/2011 | |
| JP | 2013-165569 | A | | 8/2013 | |
| JP | 2020-507301 | A | | 3/2020 | |
| JP | 2020-127318 | A | | 8/2020 | |
| JP | 2020-526161 | A | | 8/2020 | |
| JP | 2020-145003 | A | | 9/2020 | |
| KR | 10-1156342 | B1 | | 6/2012 | |
| KR | 10-1542094 | B1 | | 8/2015 | |
| KR | 20170072474 | A | * | 6/2017 | H01M 10/425 |
| KR | 10-2018-0049734 | A | | 5/2018 | |
| KR | 20180067140 | A | * | 6/2018 | G01R 31/389 |
| KR | 10-2018-0109519 | A | | 10/2018 | |
| KR | 10-2035677 | B1 | | 10/2019 | |
| KR | 10-2123671 | B1 | | 6/2020 | |
| KR | 10-2020-0086956 | A | | 7/2020 | |
| WO | 2012/131797 | A1 | | 10/2012 | |
| WO | 2013/051157 | A1 | | 4/2013 | |
| WO | WO-2017105046 | A1 | * | 6/2017 | G01R 31/3648 |
| WO | WO-2020145550 | A1 | * | 7/2020 | H02J 7/80 |
| WO | WO-2020226297 | A1 | * | 11/2020 | H02J 7/80 |

OTHER PUBLICATIONS

Extended European Search Report (EESR) dated Feb. 1, 2024, issued in corresponding European Patent Application No. 21915486.1.

Third Party Observation dated Feb. 14, 2024, issued in corresponding European Patent Application No. 21915486.1.

Office Action dated Sep. 19, 2023, issued in corresponding Japanese Patent Application No. 2022-562468.

Office Action dated Jul. 14, 2025, issued in corresponding Korean Patent Application No. 10-2020-0184479.

* cited by examiner

METHOD OF ASSIGNING COMMUNICATION ID AND BATTERY PACK PROVIDING THE METHOD

CROSS-REFERENCE TO RELATED APPLICATION

This application claims priority to and the benefit of Korean Patent Application No. 10-2020-0184479 filed in the Korean Intellectual Property Office on Dec. 28, 2020, the entire contents of which are incorporated herein by reference.

TECHNICAL FIELD

The present invention relates to a method of assigning a communication ID for communication between a master Battery Management System (BMS) and a plurality of slave BMSs, and a battery pack providing the method.

BACKGROUND ART

Electric vehicles (EVs), such as a Hybrid Vehicle (HV), a Plug-in Hybrid Electric Vehicle (PHEV), and a Battery Electric Vehicle (BEV) may be driven with a high-voltage battery. In order to provide high-voltage power, a battery system may include a battery pack in which a plurality of battery modules is serially connected, and the battery pack may include at least one battery module and a Battery Management System (BMS).

The BMS may include a plurality of slave BMSs which monitors and manages each of the plurality of battery modules, and a master BMS which collectively manages the plurality of slave BMSs. The plurality of slave BMSs may transmit data including voltage and temperature information of a battery cell to the master BMS through various communication methods. For example, the plurality of slave BMSs may communicate with the master BMS through CAN communication that is one of the in-vehicle communication methods.

In the related art, the plurality of BMSs located inside the battery pack transceives data and commands by a wire communication method. In this case, the master BMS assigns an ID for communication inside the battery pack based on a location, that is, a wire connection order, of each of the plurality of slave BMSs. However, there is a problem in that an internal circuit of the battery pack is complex due to a communication line, a power supply line, or the like. Recently, as a part of the circuit simplification direction, there is an attempt to communicate with a wireless communication method inside the battery pack.

In the meantime, in the case of the wireless communication, there is a concern about how to assign an ID for wireless communication inside the battery pack.

For example, a method of inputting the wireless communication ID of each of a plurality of slave BMSs to the master BMS based on the serial number or unique number of the battery module before assembling the battery pack may be considered. However, in this case, there is a problem due to a delay in the manufacturing process time, a human error of a technician performing the manufacturing, and the like. For another example, a method of assigning a wireless communication ID based on the wireless communication signal strength corresponding to the distance between the master BMS and the slave BMS may be considered. However, even in this case, there is a problem in that the error may be large due to the interference of various structures (components and the like) existing inside the battery pack.

DISCLOSURE

Technical Problem

The present invention provides a method of assigning a communication ID of each of the plurality of slave Battery Management Systems (BMSs) based on a connection order of a plurality of battery modules, and a battery pack providing the method.

Technical Solution

A battery pack according to one characteristic of the present invention is a battery pack in which a plurality of battery modules including a plurality of serially connected battery cells is serially connected, the battery pack including: a plurality of slave Battery Management Systems (BMSs) configured to manage the plurality of battery modules; and a master BMS configured to control the plurality of slave BMSs so that the plurality of battery modules is charged after a predetermined battery module is discharged, and receive data indicating a first cell voltage before the charging of the battery cell and a second cell voltage after the charging of the battery cell from the plurality of slave BMSs, in which the master BMS determines a battery module including a low-voltage battery cell having the second cell voltage lower than the first cell voltage as a battery module located at a higher potential adjacent to the discharged battery module and estimates a connection order of the plurality of battery modules, and assigns a communication ID of each of the plurality of slave BMSs based on the estimated connection order of the plurality of battery modules.

The first cell voltage and the second cell voltage may be the cell voltages of the battery cell located at the lowest potential within the battery module.

The second cell voltage may be synchronized and measured at a time of the charging.

When there is a history of controlling the slave BMS so that the predetermined battery module is discharged and there is a battery module located at the higher potential, the master BMS may control a corresponding slave BMS so that the battery module located at the higher potential is discharged.

When there is no history of controlling the slave BMS so that the predetermined battery module is discharged, the master BMS may control a corresponding slave BMS so that a predetermined battery module among the plurality of battery cells is discharged.

When there is a history of controlling the slave BMS so that the predetermined battery module is discharged and there is no battery module located at the higher potential, the master BMS may control a corresponding slave BMS so that a predetermined battery module among undischarged battery modules having no discharge history is discharged.

When there is no undischarged battery module having no discharge history among the plurality of battery cells, the master BMS may assign the communication ID of each of the plurality of slave BMSs based on the estimated connection order of the plurality of battery modules.

A method of assigning a communication ID according to one characteristic of the present invention is a method of assigning, by a master BMS, a communication ID of each of a plurality of slave BMSs that manages a plurality of battery modules in a battery pack in which the plurality of battery modules including a plurality of serially connected battery cells is serially connected, the method comprising: transmitting a discharge command to a corresponding slave BMS and controlling the slave BMS so that a predetermined battery module is discharged for a predetermined discharge period; when the discharge period elapses, transmitting a charge command to the plurality of slave BMSs and controlling the plurality of slave BMSs so that the plurality of battery modules is charged; determining a battery module including a low-voltage battery cell having a second cell voltage after charging lower than a first cell voltage before charging of the battery cell as a battery module located at a higher potential adjacent to the discharged battery module and estimating a connection order of the plurality of battery modules; and assigning a communication ID of each of the plurality of slave BMSs based on the estimated connection order of the plurality of battery modules.

The first cell voltage and the second cell voltage may be the cell voltages of the battery cell located at the lowest potential within the battery module.

The second cell voltage may be synchronized and measured at a time of the charging.

The transmitting of the discharge command to the slave BMS and the controlling of the slave BMS may include: determining whether there is a history of controlling the slave BMS so that the predetermined battery module is discharged; when there is the history of controlling the slave BMS so that the predetermined battery module is discharged as a result of the determination, determining whether there is a battery module located at the higher potential; and when there is the battery module located at the higher potential as a result of the determination, controlling a corresponding slave BMS so that the battery module located at the higher potential is discharged.

The transmitting of the discharge command to the slave BMS and the controlling of the slave BMS may include: determining whether there is a history of controlling the slave BMS so that the predetermined battery module is discharged; and when there is no history of controlling the slave BMS so that the predetermined battery module is discharged as a result of the determination, controlling a corresponding slave BMS so that a predetermined battery module among the plurality of battery cells is discharged.

The transmitting of the discharge command to the slave BMS and the controlling of the slave BMS may include: determining whether there is a history of controlling the slave BMS so that the predetermined battery module is discharged; when there is the history of controlling the slave BMS so that the predetermined battery module is discharged as a result of the determination, determining whether there is a battery module located at the higher potential; and when there is no history of controlling the slave BMS so that the predetermined battery module is discharged as the result of the determination, controlling a corresponding slave BMS so that a predetermined battery module among undischarged battery modules having no discharge history is discharged.

The method may further include, after the estimating of the connection order of the plurality of battery modules, determining whether there is a undischarged battery module having no discharge history among the plurality of battery modules, in which when there is no undischarged battery module having no discharge history among the plurality of battery modules as a result of the determination, the assigning of the communication ID of each of the plurality of slave BMSs may be performed.

Advantageous Effects

The present invention is capable of assigning a communication ID of each of the plurality of slave BMSs even in the case where the communication is performed in a battery pack by a wireless communication method, as well as a wire communication method.

The present invention does not required an addition of a separate circuit or an addition of a process for assigning of a communication ID of each of the plurality of slave BMSs.

MODE FOR INVENTION

Figure 1:
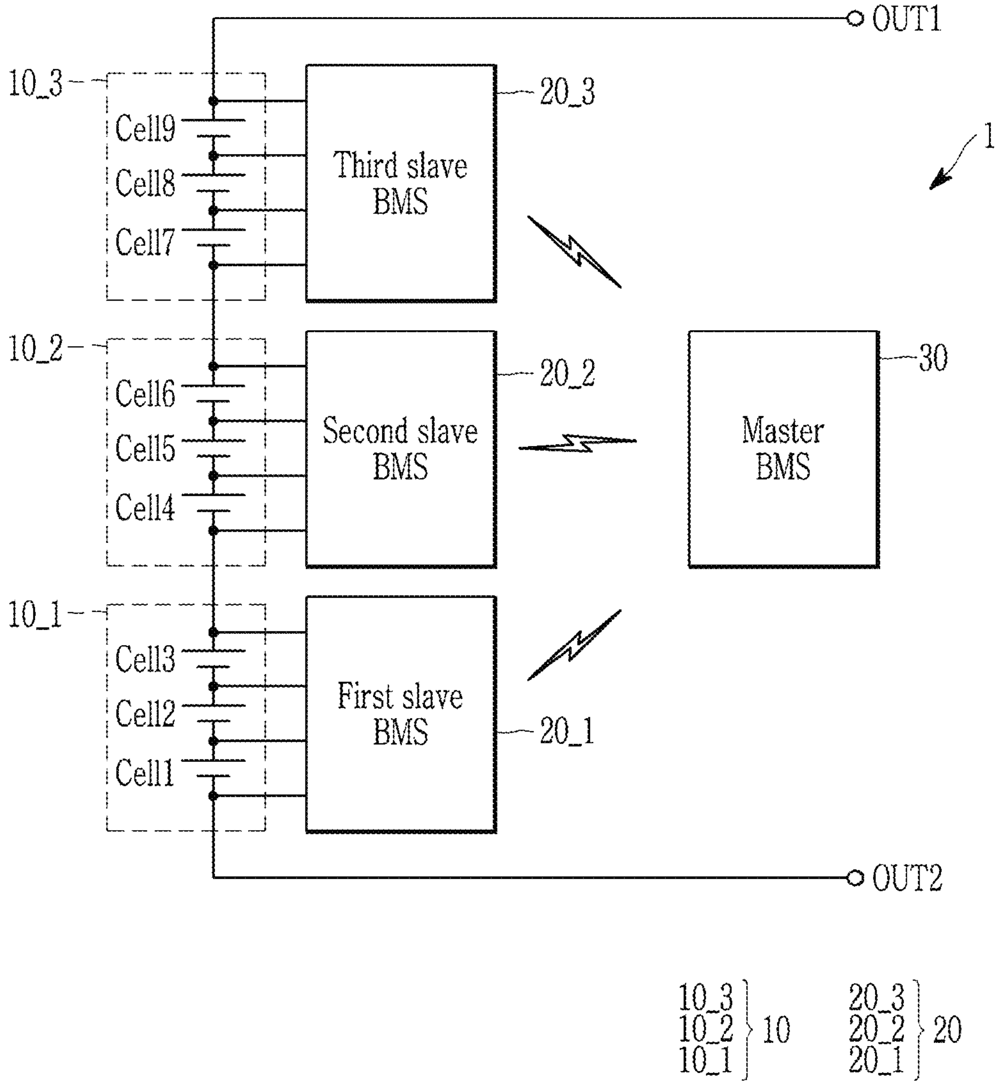
FIG. 1 is a diagram illustrating a battery pack according to an exemplary embodiment.

Hereinafter, an exemplary embodiment disclosed the present specification will be described in detail with reference to the accompanying drawings, and the same or similar constituent element is denoted by the same reference numeral regardless of a reference numeral, and a repeated description thereof will be omitted. Suffixes, "module" and "unit" for a constituent element used for the description below are given or mixed in consideration of only easiness of the writing of the specification, and the suffix itself does not have a discriminated meaning or role. Further, in describing the exemplary embodiment disclosed in the present disclosure, when it is determined that detailed description relating to well-known functions or configurations may make the subject matter of the exemplary embodiment disclosed in the present disclosure unnecessarily ambiguous, the detailed description will be omitted. Further, the accompanying drawings are provided for helping to easily understand exemplary embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

Terms including an ordinary number, such as first and second, are used for describing various constituent elements, but the constituent elements are not limited by the terms. The terms are used only to discriminate one constituent element from another constituent element.

It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to"

another constituent element, it should be understood that there are no intervening elements.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Figure 2:
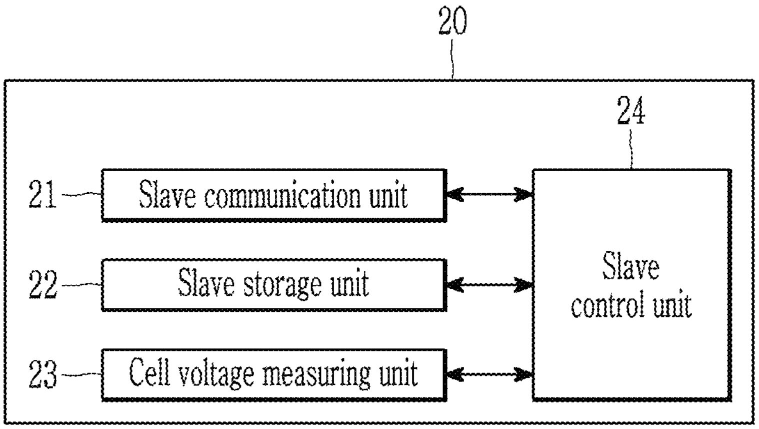
FIG. 2 is a block diagram for describing a function of a slave Battery Management System (BMS) of FIG. 1.
Figure 3:
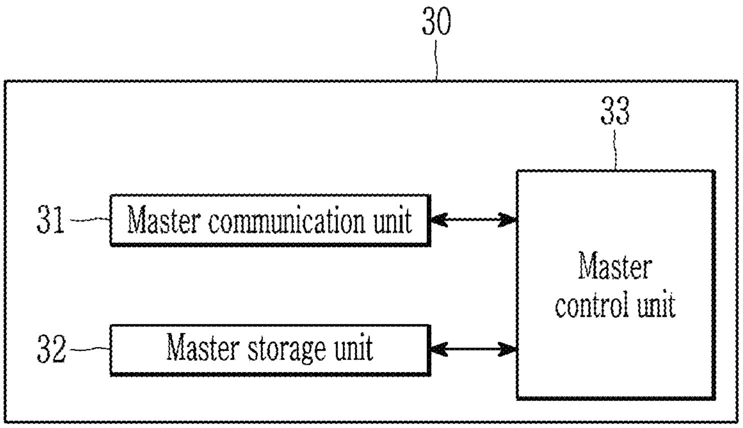
FIG. 3 is a block diagram for describing a function of a master BMS of FIG. 1.

FIG. 1 is a diagram illustrating a battery pack according to an exemplary embodiment, FIG. 2 is a block diagram for describing a function of a slave Battery Management System (BMS) of FIG. 1, and FIG. 3 is a block diagram for describing a function of a master BMS of FIG. 1.

Referring to FIG. 1, the battery pack 1 includes a plurality of battery modules 10_1, 10_2, and 10_3, a plurality of slave BMSs 20_1, 20_2, and 20_3, and a master BMS 30.

The battery module 10 includes a plurality of battery cells cell1, cell2, and cell3 which are serially connected. The plurality of battery modules 10_1, 10_2, and 10_3 is serially connected to supply necessary power. In FIG. 1, the plurality of serially connected battery modules 10_1, 10_2, and 103 is connected between two output terminals OUT1 and OUT2, and the number of serially connected battery modules 10 increases, power than may be supplied increases. In FIG. 1, three battery modules 10 and the case where each battery module 10 includes three battery cells are illustrated, but the present invention is not limited thereto, and the numbers of serially connected battery modules 10 and battery cells may be variously determined according to a selection.

In FIG. 1, a first battery module 10_1 connected at the lowermost end has the lowest potential and a third battery module 10_3 connected at the topmost end has the highest potential. Hereinafter, the plurality of battery cells included in the serially connected first to third battery modules 10_1, 10_2, and 10_3 is defined as the first battery cell cell1, the second battery cell cell2, and the like in the order of increasing potential. Therefore, in FIG. 1, the battery cell located at the lowest potential is the first battery cell cell1, and the battery cell located at the highest potential is the ninth battery cell cell9.

For example, when a cell voltage of the battery cell is 5 V within a predetermined error range, the voltage suppliable by the serially connected first to third battery modules 10_1, 102, and 10_3 may be a total of 45 V. The cell voltage may be calculated by a difference between a potential corresponding to a location of a corresponding battery cell and a potential corresponding to a location of a lower battery cell. Hereinafter, this will be described in detail with reference to FIGS. 4 and 5.

The slave BMS 20 may monitor and control the electrically connected battery module 10. For example, the plurality of slave BMSs 20_1, 20_2, and 20_3 may measure or predict the state (for example, temperature, cell voltage, and SOC) of the battery cell included in the plurality of battery modules 10_1, 102, and 10_3 and transmit the measured or predicted state of the battery cell to the master BMS 30. Further, the slave BMS 20 may control (for example, charge/discharge and smoothen) the battery module 10 according to a control signal received from the master BMS 30.

Referring to FIG. 2, the slave BMS 20 may include a slave communication unit 21, a slave storing unit 22, a cell voltage measuring unit 23, and a slave control unit 24.

The slave communication unit 21 may include a communication module for communicating with the master BMS 30. According to the exemplary embodiment, the slave communication unit 21 may include a Controller Area Network (CAN) communication module and a wireless communication module.

In the slave storage unit 22, a first cell voltage and a second cell voltage measured in the cell voltage measuring unit 23 may be stored. In this case, the slave control unit 24 may transmit the first cell voltage and the second cell voltage stored in the slave storage unit 22 to the master BMS 30 through the slave communication unit 21.

The cell voltage measuring unit 23 may measure a cell voltage of the plurality of battery cells included in the battery module 10 periodically or in real time, and store the measured cell voltage in the slave storage unit 22.

The slave control unit 24 may discharge or charge the battery module 10 according to a control command of the master BMS 30. According to the exemplary embodiment, the slave control unit 24 may extract the first cell voltage measured immediately before the charging time and the second cell voltage measured immediately after the charging time of the battery cell located at the lowest potential within the battery module 10 from the slave storage unit 22 and, transmit the extracted first cell voltage and second cell voltage to the master BMS 30.

The master BMS 30 may be a higher control device that integrates and controls the plurality of slave BMSs 20_1, 202, and 20_3. To this end, the master BMS 30 may communicate with the plurality of slave BMSs 20_1, 20_2, and 20_3 in order to request and receive necessary information. In this case, the master BMS 30 may perform 1:1 communication or 1:N communication with the plurality of slave BMSs 20_1, 20_2, and 20_3 through a CAN communication method or a wireless communication method, and may identify the plurality of slave BMSs 20_1, 20_2, and 20_3 through a communication ID.

Referring to FIG. 3, the master BMS 30 may include a master communication unit 31, a master storage unit 32, and a master control unit 33.

The master communication unit 31 may include a communication module for communicating with the plurality of slave BMSs 20_1, 202, and 20_3. According to the exemplary embodiment, the master communication unit 31 may include a CAN communication module and a wireless communication module.

In the master storage unit 32, the first cell voltage and the second cell voltage transmitted from the plurality of slave BMSs 20_1, 20_2, and 20_3 may be stored. According to the exemplary embodiment, in the master storage unit 32, a connection order of the battery module 10 estimated by the master communication unit 31 may be stored.

The master control unit 33 may generally control the master BMS 30, and integrates and manage the plurality of slave BMSs 20_1, 20_2, and 20_3. According to the exemplary embodiment, the master control unit 33 may assign a communication ID of the plurality of slave BMSs 20_1, 20_2, and 20_3 based on the connection order of the plurality of battery modules 10_1, 102, and 10_3.

Figure 4:
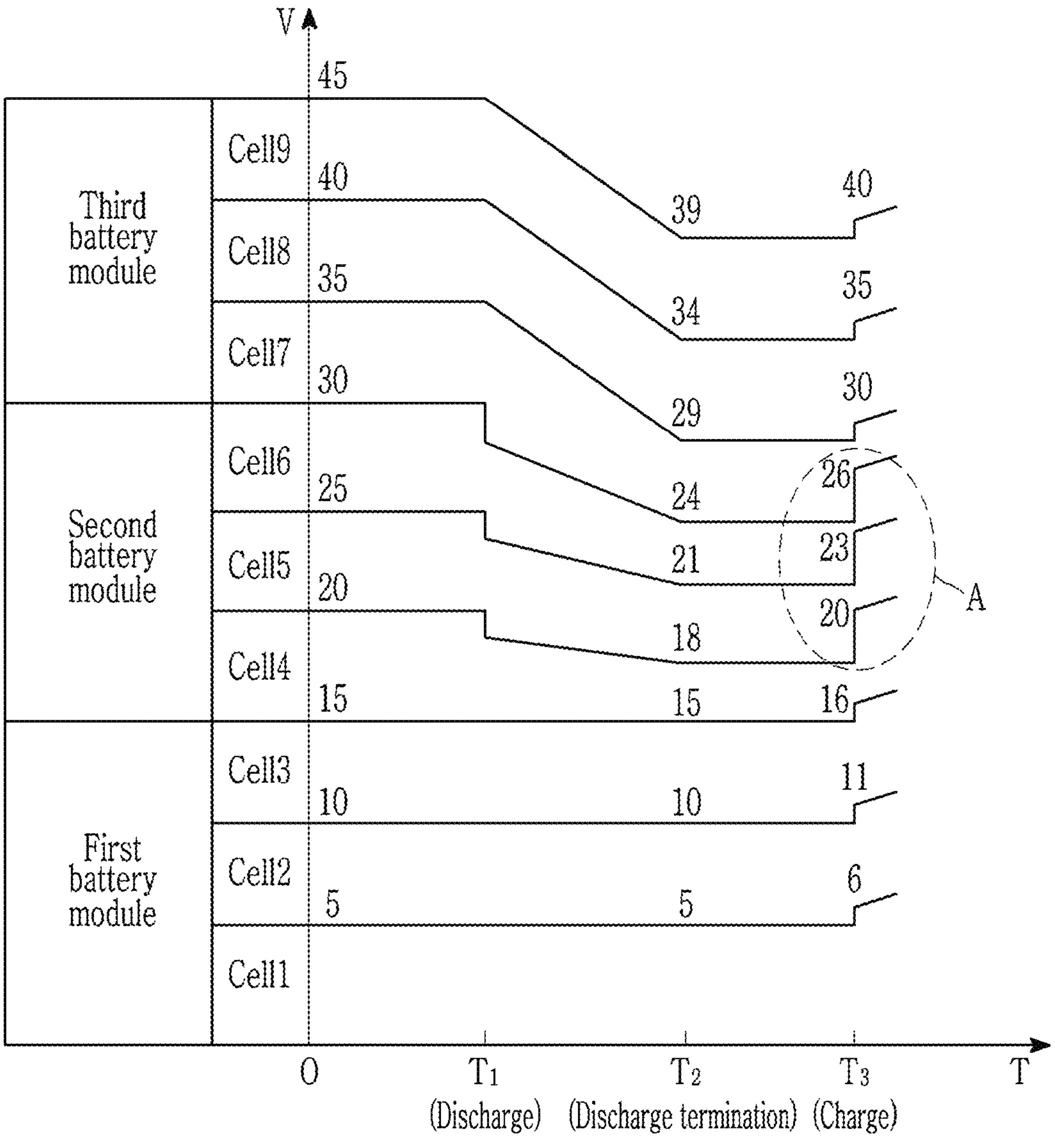
FIG. 4 is a diagram illustrating a change in potential of a battery module over time according to the exemplary embodiment.
Figure 5:
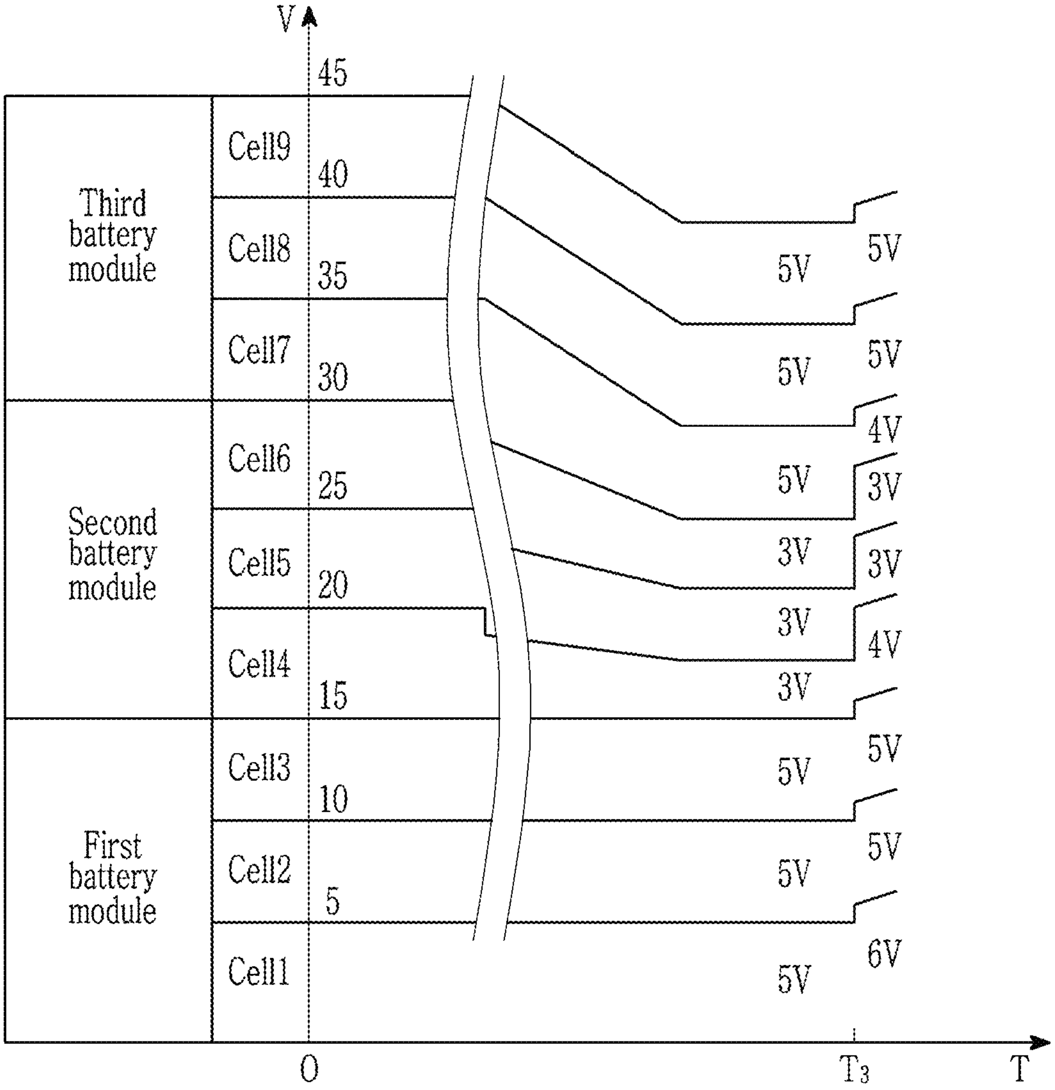
FIG. 5 is a diagram illustrating a change in a cell voltage of a battery cell over time in FIG. 4.

FIG. 4 is a diagram illustrating a change in potential of the battery module over time according to the exemplary embodiment, and FIG. 5 is a diagram illustrating a change in a cell voltage of the battery cell over time in FIG. 4.

For example, it is assumed that a cell voltage of each of the plurality of battery cells cell1 to cell9 is 5 V, and each of the three serially connected battery modules 10_1, 10_2, and 10_3 includes three serially connected battery cells. Referring to FIG. 4, nine battery cells (cell1 to cell9) are serially connected, and the total voltage of the battery pack 1 is 45 V. The potential increases from the first battery cell (cell1) to the ninth battery cell (cell9), but the cell voltage of each battery cell is 5 V.

According to the exemplary embodiment, referring to FIG. 4, the first battery module 10_1 is the battery module 10 located at the lowest potential, and the third battery module 10_3 is the battery module 10 located at the highest potential. Further, the second battery module 10_2 is the battery module 10 located at a higher potential adjacent to the first battery module 10_1. Further, the second battery module 10_2 is the battery module 10 located at a lower potential adjacent to the third battery module 10_3.

In particular, the connection order of the plurality of battery modules 10_1, 10_2 and 10_3 may be configured so that the second battery module 10_2 is located at an adjacent higher potential of the first battery module 10_1, and the third battery module 10_3 is located at an adjacent higher potential of the second battery module 10_2. According to the exemplary embodiment, exemplary embodiment, the master BMS 30 may assign a first communication ID (ID_1), a second communication ID (ID_2), and a third communication ID (ID_3) to the first slave BMS 20_1, the second slave BMS 20_2, and the third slave BMS 20_3 that manage the first battery module 10_1, the second battery module 10_2, and the third battery module 103, respectively.

The master BMS 30 may assign the communication ID to each of the plurality of slave BMSs 20_1, 202, and 20_3 at the initial driving time of the battery pack 1. In this case, the master BMS 30 may assign the communication ID of the slave BMS 20 so as to correspond to an electrical position of the battery module 10 managed by the corresponding slave BMS 20. That is, the allocation of the communication ID of the plurality of slave BMSs 20_1, 20_2, and 20_3 may mean to check the electrical position of the plurality of battery modules 10_1, 10_2, and 10_3, that is, the connection order of the plurality of battery modules 10_1, 102, and 10_3.

The master BMS 30 may control a predetermined battery module 10 among the battery modules 10_1, 10_2, and 10_3 to be discharged during a predetermined discharge period, and then control the entire plurality of battery modules 10_1, 102, and 10_3 to be charged. According to the exemplary embodiment, the master BMS 30 estimates the battery module 10 including the low-voltage battery cell as the battery module 10 connected to be adjacent to the higher potential of the discharged battery module 10. The low-voltage battery cell is battery cell in which the second cell voltage measured immediately after the charging is lower than the first cell voltage measured immediately before the charging.

For example, referring to FIG. 4, in the state that the connection order of the plurality of battery modules 10_1, 10_2, and 10_3 is not known, the master BMS 30 may control the first to third battery modules 10_1, 10_2, and 10_3 to be charged after the second battery module 10_2 is discharged. The master BMS 30 estimates the third battery module 10_3 including the low-voltage battery cell as the battery module 10 connected to be adjacent to the higher potential of the discharged second battery module 10_2.

The master BMS 30 may estimate the whole connection order of the plurality of battery modules 10_1, 10_2, and 10_3 by repeatedly performing the method. The master BMS 30 may assign a communication ID of the plurality of slave BMSs 20_1, 20_2 and 20_3 based on the whole connection order of the plurality of battery modules 10_1, 10_2, and 10_3.

In the meantime, when the battery module 10 is charged, a size of the voltage instantaneously increasing at the time of charging may be different for each battery cell according to internal resistance. In particular, the internal resistance of the battery cell may be different according to a cell voltage, more precisely, the State Of Charge (SOC). When the cell voltage of the battery cell is low, the internal resistance is large, so that the size of the voltage instantaneously increased during charging (hereinafter referred to as the voltage increase amount) is greater than the voltage increase amount of the battery cell with low internal resistance.

Referring to FIG. 4, for example, from a first time T1 to a second time T2, the master BMS 30 may control the second slave BMS 20_2 so that the second battery module 10_2 is discharged. Then, at a third time T3, the master BMS 30 may control the first to third slaves BMS 20_1, 202, and 20_3 so that the entirety of the first to third battery modules 10_1, 10_2, and 10_3 are charged.

Referring to FIG. 5, the second battery module 102 is discharged, so that each of the first cell voltage of the fourth to sixth battery cells (cell4, cell5, and cell6) is 3 V. The first cell voltage of each of the first to third battery cells (cell1, cell2, and cell3) of the first battery module 10_1 that is not discharged, and the seventh to ninth battery cells (cell7, cell8, and cell9) of the third battery module 10_3 is 5 V.

Referring to FIG. 4, at the third time T3, when the first to third battery modules 10_1, 102, and 10_3 are charged, the amount of voltage increased of the fourth to sixth battery cells (cell4, cell5, and cell6) of the second battery module 10_2 of which the first cell voltage (3 V) is low is 2 V. In the meantime, the amount of voltage increased of the first to third battery cells cell1, cell2, and cell3 of the first battery module 10_1 having the high first cell voltage (5 V) and the seventh to ninth battery cells cell7, cell8, and cell9 of the third battery module 10_3 may be 1 V.

Referring to FIGS. 4 and 5, the cell voltage is a potential difference from the reference potential. Therefore, a reference point of the first battery cell cell1 is a ground GND (0 V). The second cell voltage of the first battery cell cell1 may be 6V by adding the amount 1 V of voltage increased compared to the ground GND to the first cell voltage 5 V. A reference point of the second battery cell cell2 is the potential of the first battery cell cell1. The second battery cell cell2 has the voltage increase amount (1 V), but the potential of the first battery cell cell1 that is the reference point is equally increased. Therefore, the second cell voltage of the second battery cell cell2 is the same as the first cell voltage (5 V). By the same method, as illustrated in FIG. 5, the second cell voltage of each of the plurality of battery cells cell1 to cell9 may be calculated.

According to the exemplary embodiment, a reference point of the seventh battery cell cell7 may be a potential of the sixth battery cell cell6. The first cell voltage of the seventh battery cell cell7 measured between the first time T1 and the second time T2 or immediately before the third time T3 is 5 V (29 V−24 V=5 V), and the second cell voltage synchronized and measured at the third time T3 is 4 V (30 V−26 V=4 V) which is lower than the first cell voltage (5 V). This may be considered to occur because the voltage increase amount (2 V) of the sixth battery cell cell6, which is the reference point, is larger than the voltage increase amount (1 V) of the seventh battery cell cell7. In this case, the seventh battery cell cell7 is defined as the low-voltage battery cell of which the second cell voltage is lower than the first cell voltage.

To summarize, the master BMS 30 may determine the battery module including the low voltage battery cell having the second cell voltage lower than the first cell voltage as the battery module located at a higher potential adjacent to the discharged battery module.

Figure 6:
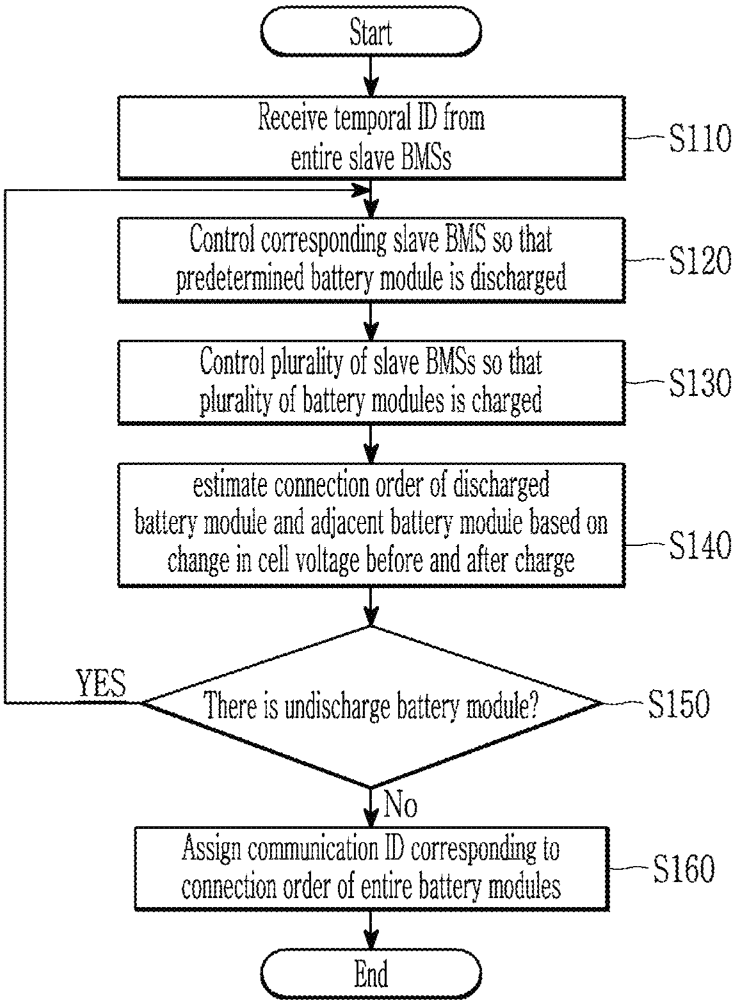
FIG. 6 is a flowchart describing a method of assigning a communication ID according to an exemplary embodiment.
Figure 7:
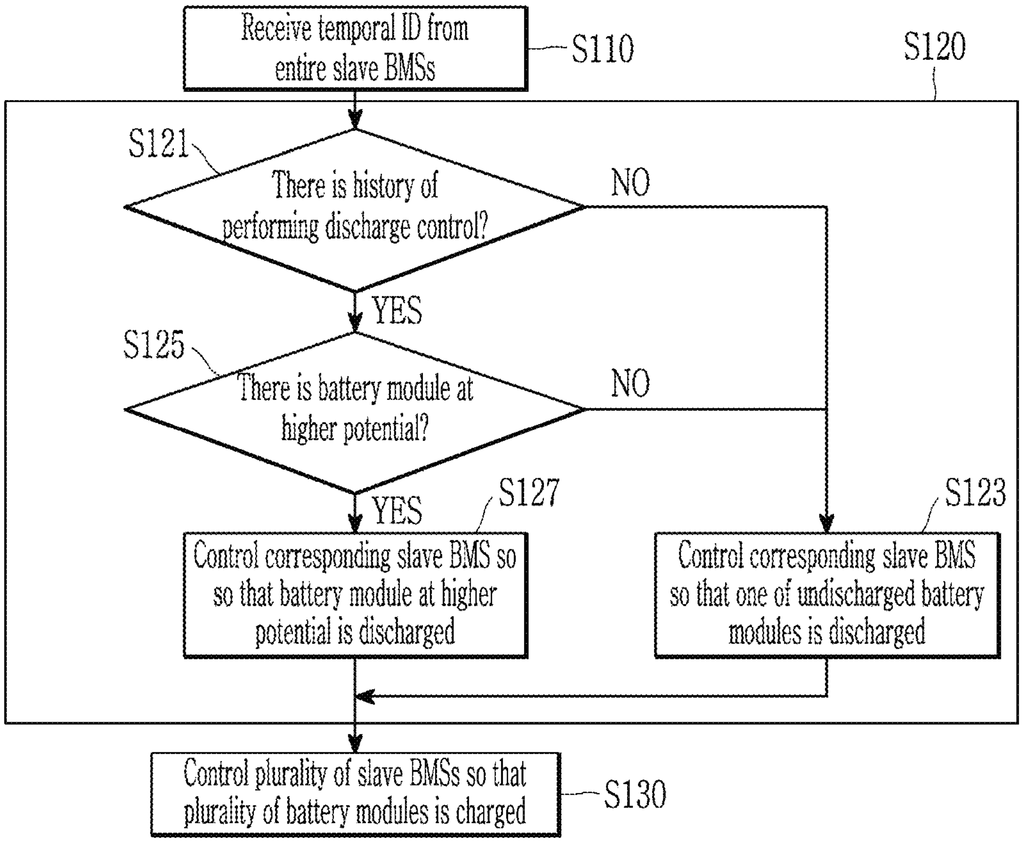
FIG. 7 is a flowchart for describing operation S120 of FIG. 6 in detail.

FIG. 6 is a flowchart describing a method of assigning a communication ID according to an exemplary embodiment, and FIG. 7 is a flowchart for describing operation S120 of FIG. 6 in detail.

Hereinafter, a method of assigning a communication ID and a battery pack providing the method will be described with reference to FIGS. 1 to 7.

First, the master BMS 30 receives a temporal communication ID from a plurality of slave BMSs 20_1, 20_2, and 20_3 (S110).

When the battery pack is initially driven, when the master BMS 30 broadcasts a signal commanding to transmit the temporal communication ID through a network, each of the plurality of slave BMSs 20_1, 20_2, and 20_3 may transmit the temporal communication ID to the master BMS 30. For example, the temporal communication ID may include a serial number, a unique number, and the like.

The temporal communication ID may be identification information for discriminating a predetermined slave BMS 20 from another slave BMS 20, but does not include information corresponding to a connection order or a connection position of the battery module 10. According to the exemplary embodiment, the communication ID assigned by the master BMS 30 to the slave BMS 20 by the method described below may be calculated based on a connection order or a connection location of the battery module 10.

Next, the master BMS 30 controls a corresponding slave BMS so that a predetermined battery module 10 among the plurality of battery modules 10_1, 102, and 10_3 is discharged for a predetermined discharge period (S120).

According to the exemplary embodiment, the master BMS 30 may randomly select the battery module 10 to be discharged. The battery module 10 having no previous discharge history and the battery module 10 having a discharged history may not be distinguished.

According to another exemplary embodiment, the master BMS 30 may select the battery module 10 to be discharged according to an algorithm which is described with reference to FIG. 7. In the present exemplary embodiment, a connection order of the whole battery modules 10 may be estimated faster than the exemplary embodiment in which the battery module 10 having no previous discharge history and the battery module having a discharged history are not distinguished.

Referring to FIG. 7, in operation S120, the master BMS 30 determine whether there is a history of controlling the corresponding slave BMS 20 so that a predetermined battery module 10 is discharged (S121).

As a result of the determination, when there is no history of controlling the corresponding slave BMS 20 (NO in operation S121), the master BMS 30 may randomly select one battery module 10 among the plurality of battery modules 10_1, 10_2, and 10_3, transmit a discharge command to the corresponding slave BMS 20, and control the selected battery module 10 to be discharged (S123).

In this case, the case where there is no discharge control history means that the discharge control to be performed is the first discharge control. Therefore, all of the plurality of battery modules 10_1, 102, and 10_3 are the undischarged battery modules 10. For example, the master BMS 30 may control the second slave BMS 20_2 so that the second battery module 10_2 is discharged.

As a result of the determination, when there is the history of controlling the corresponding slave BMS 20 (YES in operation S121), the master BMS 30 determines whether there is a battery module 10 located at a higher potential (S125).

As a result of the determination, when there is the battery module 10 located at the higher potential (YES in operation S125), the master BMS 30 controls the corresponding slave BMS 20 so that the battery module 10 located at the higher potential is discharged (S127).

Hereinafter, according to the method to be described, the battery module 10 located at the higher potential of the discharged second battery module 10_2 is the third battery module 10_3. For example, the master BMS 30 may control the third slave BMS 20_3 so that the third battery module 10_3 is discharged. Then, the battery module 10 may be discharged in the order of the second battery module 10_2 and the third battery module 10_3, that is, in the order of increasing the potential.

As the result of the determination, when there is no battery module 10 located at the higher potential (NO in operation S125), the master BMS 30 controls the corresponding slave BMS so that a predetermined battery module 10 among the undischarged battery modules 10 having no discharge history is discharged (S123).

In particular, the case where there is the history for controlling the discharge (YES in operation S121) but there is no battery module 10 located at the higher potential (NO in operation S125) means that the battery module 10 corresponding to the highest potential within the battery pack 1 has been already controlled to be discharged. For example, when the second battery module 10_2 and the third battery module 10_3 are discharged, so that the connection order thereof has been confirmed. Then, the master BMS 30 may control the corresponding first slave BMS 20_1 so that the first battery module 10_1 having no discharge history is discharged.

Next, when the discharge period elapses, the master BMS 30 controls the plurality of slave BMSs 20_1, 20_2, and 20_3 so that the plurality of battery modules 10_1, 10_2, and 10_3 is charged (S130).

Next, the master BMS 30 determines the battery module 10 including the low-voltage battery cell of which the second cell voltage after the charge is lower than the first cell voltage before the charge of the battery cell as the battery module 10 of the higher potential adjacent to the discharged battery module 10, and estimates a connection order of the plurality of battery modules 10_1, 10_2, and 103 (S140).

Referring to FIG. 4, for example, from the first time T1 to the second time T2, the master BMS 30 may control the second slave BMS 20_2 so that the second battery module 10_2 is discharged. Then, at a third time T3, the master BMS 30 may control the first to third slaves BMS 20_1, 202, and 20_3 so that the entirety of the first to third battery modules 10_1, 10_2, and 10_3 are charged.

Referring to FIG. 5, the second battery module 10_2 is discharged, so that each of the first cell voltage of the fourth to sixth battery cells cell4, cell5, and cell6 is 3 V. The first cell voltage of each of the first to third battery cells cell1, cell2, and cell3 of the first battery module 10_1 that is not discharged, and the seventh to ninth battery cells cell7, cell8, and cell9 of the third battery module 10_3 is 5 V.

Referring to FIG. 4, at the third time T3, when the first to third battery modules 10_1, 102, and 10_3 are charged, the amount of voltage increased of the fourth to sixth battery cells cell4, cell5, and cell6 of the second battery module 10_2 of which the first cell voltage (3 V) is low is 2 V. In the meantime, the amount of voltage increased of the first to third battery cells cell1, cell2, and cell3 of the first battery module 10_1 having the high first cell voltage (5 V) and the seventh to ninth battery cells cell7, cell8, and cell9 of the third battery module 10_3 may be 1 V.

Referring to FIGS. 4 and 5, the cell voltage is a potential difference from the reference potential. Therefore, a reference point of the first battery cell cell1 is a ground GND (0 V). The second cell voltage of the first battery cell cell1 may be 6V by adding the amount 1 V of voltage increased compared to the ground GND to the first cell voltage 5 V. A reference point of the second battery cell cell2 is the potential of the first battery cell cell1. Therefore, the second battery cell cell2 has the voltage increase amount (1 V), but the potential of the first battery cell cell1 that is the reference point is equally increased, so that the second cell voltage is the same as the first cell voltage (5 V). By the same method, the cell voltage of the plurality of battery cells cell1 to cell9 may be calculated.

According to the exemplary embodiment, a reference point of the seventh battery cell cell7 may be a potential of the sixth battery cell cell6. The first cell voltage of the seventh battery cell cell7 measured between the first time T1 and the second time T2 or immediately before the third time T3 is 5 V (29 V−24 V=5 V), and the second cell voltage synchronized and measured at the third time T3 is 4 V (30 V−26 V=4 V). This may be considered to occur because the voltage increase amount (2 V) of the sixth battery cell cell6, which is the reference point, is larger than the voltage increase amount (1 V) of the seventh battery cell cell7. In this case, the seventh battery cell cell7 is defined as the low-voltage battery cell of which the second cell voltage is lower than the first cell voltage.

To summarize, the master BMS 30 may determine the battery module 10 including the low voltage battery cell having the second cell voltage lower than the first cell voltage as the battery module located at a higher potential adjacent to the discharged battery module 10. In this case, when there is no battery module 10 including the low-voltage battery cell having the second cell voltage lower than the first cell voltage, the master BMS 30 may determine the discharged battery module 10 as the battery module located at the highest potential within the battery pack 1.

For example, in the processes S120 to S140 of controlling the second battery module 10_2 to be discharged, the master BMS 30 may estimate the connection order that the battery module 10 of the higher potential of the second battery module 10_2 is the third battery module 10_3. In the processes S120 to S140 of controlling the second battery module 10_2 and the third battery module 10_3 to be sequentially discharged, the master BMS 30 estimates the connection order that the battery module 10 of the higher potential of the second battery module 10_2 is the third battery module 10_3 and the third battery module 10_3 is the highest battery module.

Next, the master BMS 30 determines whether there is a undischarged battery module 10 having no discharge history among the plurality of battery modules 10_1, 10_2 and 103 (S150).

As a result of the determination, when there is the undischarged battery module (YES in operation S150), the master BMS 30 repeats the process from operation S120 in which the undischarged battery module 10 is controlled to be discharged. For example, the master BMS 30 may repeat operation S120 to S140 until the undischarged battery module 10 does not exist in the plurality of battery modules 10_1, 10_2, and 10_3.

As a result of the determination, when there is no undischarged battery module (No in operation S150), the master BMS 30 assigns a communication ID f each of the plurality of slave BMSs 20_1, 20_2, and 20_3 based on the estimated connection order of the plurality of battery modules 10_1, 10_2, and 103 (S160).

In particular, the connection order of the plurality of battery modules 10_1, 10_2 and 10_3 may be configured so that the second battery module 10_2 is located at an adjacent higher potential of the first battery module 10_1, and the third battery module 10_3 is located at an adjacent higher potential of the second battery module 10_2.

According to the exemplary embodiment, the master BMS 30 may assign a first communication ID (ID_1), a second communication ID (ID_2), and a third communication ID (ID_3) to the first slave BMS 20_1, the second slave BMS 20_2, and the third slave BMS 20_3 that manage the first battery module 10_1, the second battery module 10_2, and the third battery module 10_3, respectively.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A battery pack in which a plurality of battery modules including a plurality of serially connected battery cells is serially connected, the battery pack comprising:

a plurality of slave Battery Management Systems (BMSs) configured to manage the plurality of battery modules; and a master BMS configured to control the plurality of slave BMSs to charge the plurality of battery modules after a predetermined battery module among the plurality of battery modules is discharged, and to receive from the plurality of slave BMSs data indicating a first cell voltage before the charging of a battery cell and a second cell voltage after the charging of the battery cell, wherein the master BMS is further configured to:

determine a battery module among the plurality of battery modules that includes a low-voltage battery cell having the second cell voltage lower than the first cell voltage as a battery module located at a higher potential adjacent to the discharged battery module and estimate a connection order of the plurality of battery modules, and assign a communication ID of each of the plurality of slave BMSs based on the estimated connection order of the plurality of battery modules.

2. The battery pack of claim 1, wherein:

the first cell voltage and the second cell voltage are the cell voltages of the battery cell located at the lowest potential within the battery module.

3. The battery pack of claim 2, wherein:

the second cell voltage is synchronized and measured at a time of the charging.

4. The battery pack of claim 1, wherein:

if there is a history of controlling the slave BMS so that the predetermined battery module is discharged and there is a battery module located at the higher potential, the master BMS controls a corresponding slave BMS so that the battery module located at the higher potential is discharged.

5. The battery pack of claim 1, wherein:

if there is no history of controlling the slave BMS so that the predetermined battery module is discharged, the master BMS controls a corresponding slave BMS so that a predetermined battery module among the plurality of battery cells is discharged.

6. The battery pack of claim 1, wherein:

if there is a history of controlling the slave BMS so that the predetermined battery module is discharged and there is no battery module located at the higher potential, the master BMS controls a corresponding slave BMS so that a predetermined battery module among undischarged battery modules having no discharge history is discharged.

7. The battery pack of claim 1, wherein:

if there is no undischarged battery module having no discharge history among the plurality of battery cells, the master BMS assigns the communication ID of each of the plurality of slave BMSs based on the estimated connection order of the plurality of battery modules.

8. A method of assigning, by a master BMS, a communication ID of each of a plurality of slave BMSs configured to manage a corresponding one of a plurality of serially connected battery modules including a plurality of serially connected battery cells in a battery pack, the method comprising:

transmitting a discharge command to a corresponding slave BMS among the plurality of slave BMSs and controlling the corresponding slave BMS so that a predetermined battery module among the plurality of battery modules is discharged for a predetermined discharge period;

when the discharge period elapses, transmitting a charge command to the plurality of slave BMSs to control the plurality of slave BMSs to charge the plurality of battery modules;

determining a battery module among the plurality of battery modules that includes a low-voltage battery cell having a second cell voltage after the charging of the battery cell lower than a first cell voltage before the charging of the battery cell as a battery module located at a higher potential adjacent to the discharged battery module, and estimating a connection order of the plurality of battery modules; and assigning a communication ID of each of the plurality of slave BMSs based on the estimated connection order of the plurality of battery modules.

9. The method of claim 8, wherein:

the first cell voltage and the second cell voltage are the cell voltages of the battery cell located at the lowest potential within the battery module.

10. The method of claim 9, wherein:

the second cell voltage is synchronized and measured at a time of the charging.

11. The method of claim 8, wherein the transmitting of the discharge command to the slave BMS to control the slave BMS includes:

determining whether there is a history of controlling the slave BMS so that the predetermined battery module is discharged;

if there is the history of controlling the slave BMS so that the predetermined battery module is discharged as a result of the determination, determining whether there is a battery module located at the higher potential; and if there is the battery module located at the higher potential as a result of the determination, controlling a corresponding slave BMS so that the battery module located at the higher potential is discharged.

12. The method of claim 8, wherein the transmitting of the discharge command to the slave BMS to control the slave BMS includes:

determining whether there is a history of controlling the slave BMS so that the predetermined battery module is discharged; and if there is no history of controlling the slave BMS so that the predetermined battery module is discharged as a result of the determination, controlling a corresponding slave BMS so that a predetermined battery module among the plurality of battery cells is discharged.

13. The method of claim 8, wherein the transmitting of the discharge command to the slave BMS to control the slave BMS includes:

determining whether there is a history of controlling the slave BMS so that the predetermined battery module is discharged;

if there is the history of controlling the slave BMS so that the predetermined battery module is discharged as a result of the determination, determining whether there is a battery module located at the higher potential; and if there is no history of controlling the slave BMS so that the predetermined battery module is discharged as the result of the determination, controlling a corresponding slave BMS so that a predetermined battery module among undischarged battery modules having no discharge history is discharged.

14. The method of claim 8, further comprising:

after the estimating of the connection order of the plurality of battery modules, determining whether there is an undischarged battery module having no discharge history among the plurality of battery modules, wherein the assigning of the communication ID includes assigning the communication ID of each of the plurality of slave BMSs if there is no undischarged battery module having no discharge history among the plurality of battery modules as a result of the determination.

* * * * *